United States Patent [19]

Gerber et al.

[11] 4,410,846
[45] Oct. 18, 1983

[54] ELECTRIC TOOL WITH MICROCOMPUTER

[75] Inventors: Hans Gerber, Luterbach; Claude Wessel, Brugg; Ivan Hidveghy, Zuchwil, all of Switzerland

[73] Assignee: Robert Bosch GmbH, Stuttgart, Fed. Rep. of Germany

[21] Appl. No.: 170,845

[22] Filed: Jul. 21, 1980

[30] Foreign Application Priority Data

Aug. 17, 1979 [DE] Fed. Rep. of Germany ....... 2933355

[51] Int. Cl.³ .............................................. H02P 7/28
[52] U.S. Cl. .................................... 318/490; 318/305; 318/327; 364/474; 340/680
[58] Field of Search ............ 318/275, 490, 305, 341, 318/327, 328; 364/474; 340/680

[56] References Cited

U.S. PATENT DOCUMENTS

| | | | |
|---|---|---|---|
| 4,027,546 | 6/1977 | Alessio | 74/421 A |
| 4,211,967 | 7/1980 | Aklyama et al. | 318/490 |
| 4,249,117 | 2/1981 | Leukhardt et al. | 318/275 |
| 4,267,914 | 5/1981 | Saar | 318/275 X |
| 4,268,783 | 5/1981 | Murray | 318/565 |
| 4,307,325 | 12/1981 | Saar | 318/472 X |
| 4,317,176 | 2/1982 | Saar et al. | 318/305 X |

*Primary Examiner*—B. Dobeck
*Attorney, Agent, or Firm*—Frishauf, Holtz, Goodman & Woodward

[57] ABSTRACT

Speed regulation, either closed loop or open loop, in a hand-held electric tool such as a drill, a miller, a saw or, in particular, combination tools for home use, is carried out by use of a microcomputer. Then-present operating conditions such as the speed of the drill bit, the direction of rotation of the bit, the presently engaged gear, etc. are indicated by a display which has a plurality of fields which are selectively lit. Alternatively, the display can include a seven-segment indicator for displaying the speed. Overload indication is also furnished, as is an automatic shutoff when the motor current exceeds its nominal value. The display, overload indication and shutoff, etc. are all computer-controlled.

13 Claims, 5 Drawing Figures

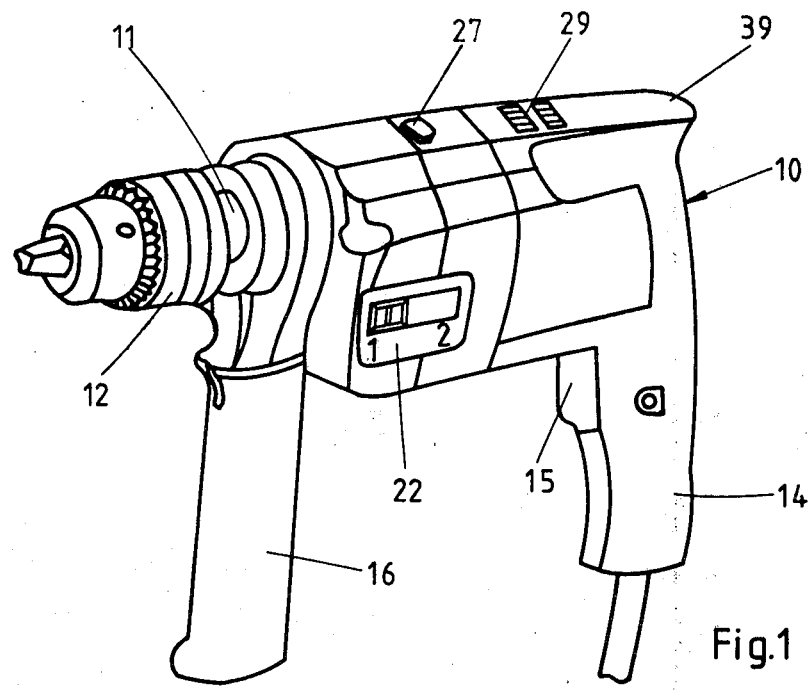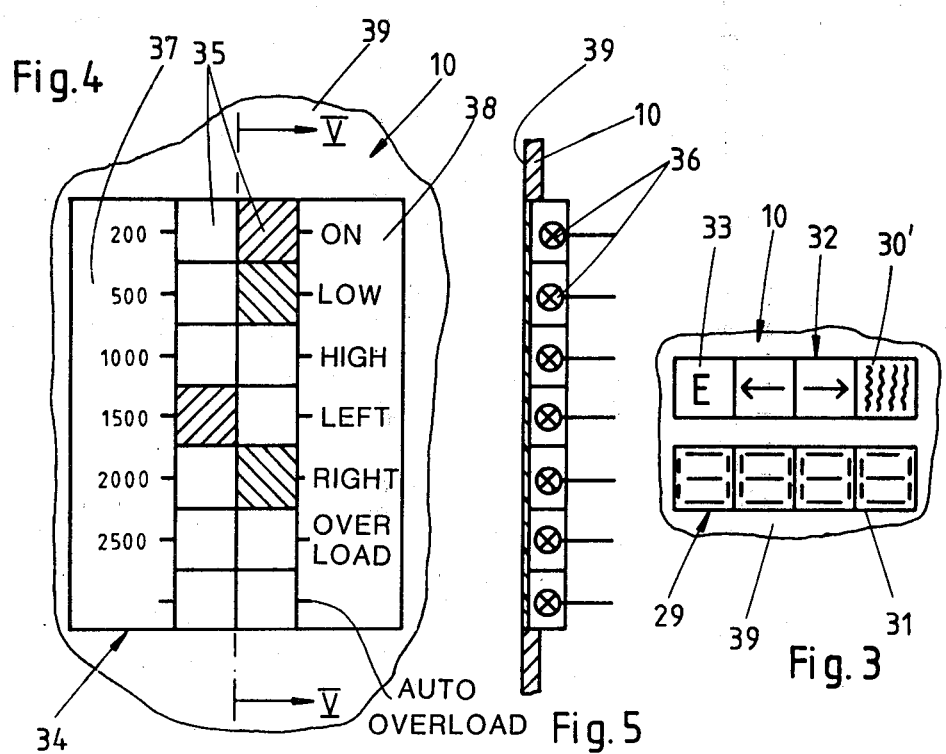

ELECTRIC TOOL WITH MICROCOMPUTER

The present invention relates to electrical hand-held tools, such as drills, milling tools, saws, and the like.

BACKGROUND AND PRIOR ART

In known tools of this type, speed regulating devices are provided which are constructed as discrete circuits. These circuits include a potentiometer so that the speed of the tool can be regulated by the operator. The actual speed control is carried out by measuring the voltage across the motor and utilizing this voltage to vary the threshold of a switch controlling the "on" time of a thyristor in the motor circuit. The "on" time of the thyristor in each cycle varies as a function of the threshold of the switch so that the angle of current flow is changed until the actual speed of the motor corresponds to the selected speed. Since the threshold of the above-mentioned switch tends to vary because of manufacturing tolerances, the actual speed of the motor may, in fact, differ quite considerably from the selected speed. While this may be acceptable for many applications, this error in speed cannot be tolerated for higher quality, more expensive tools.

THE INVENTION

It is an object of the present invention to provide a tool in which the actual motor speed is equal to the selected speed within very close tolerances. Further, only slightly more equipment is to be required so that an optical display of the selected and/or the actual speed may be furnished.

In accordance with the present invention, the speed regulation is carried out by a microcomputer. The above-mentioned display is directly controlled by the microcomputer. Thus, the operator can readily utilize the tool in an optimal fashion by selecting the correct cutting speed. This not only decreases the wear on the tool but also greatly improves the finished product.

DRAWINGS ILLUSTRATING A PREFERRED EMBODIMENT

FIG. 1 is a perspective view of an electric drill;

FIG. 3 is a top view (enlarged) of a display for the drill shown in FIG. 1;

FIG. 4 is an enlarged top view of a second embodiment of a display for the drill shown in FIG. 1; and FIG. 5 is a sectional view along line V—V of FIG. 4.

Figure 2:
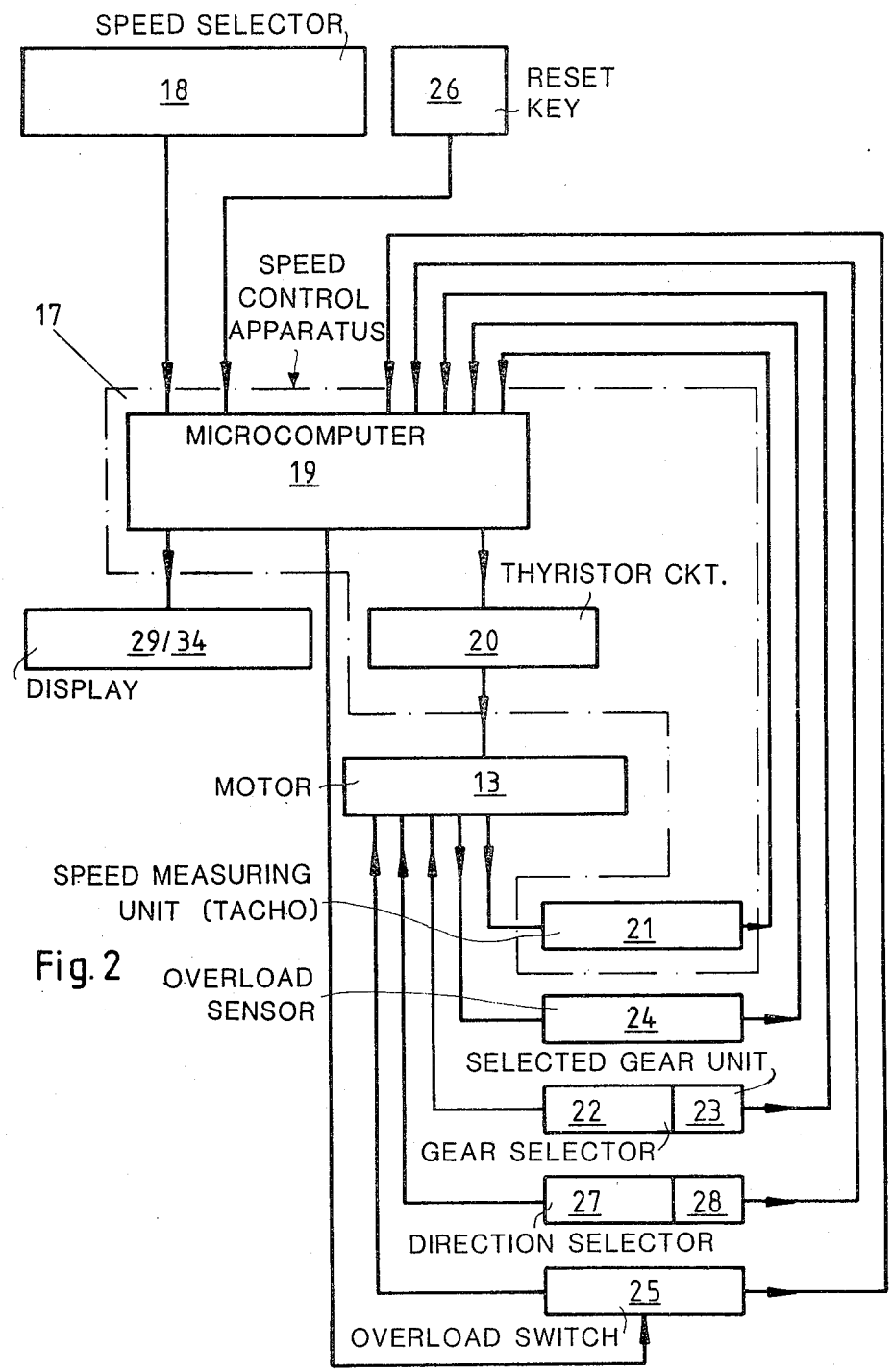
FIG. 2 is a block diagram of the electric circuit of the drill, including the speed regulating apparatus.

The electric hand-held drill shown in FIG. 1 has a housing 10. Its spindle 11 carries a chuck 12 for receiving a drill bit. An electromotor 13 (shown schematically in FIG. 2) drives spindle 11 through gearing. Electromotor 13 can rotate in both directions of rotation. A pistol-grip type handle 14 is located on the lower part of the housing. An on-off switch 15 is arranged on the handle. For ease of operation, a second handle 16 can be arranged on housing 10 in the vicinity of spindle 11.

The drill includes speed-control apparatus 17 which causes the actual speed of electromotor 13 to be equal to the selected speed. Electromotor 13 is preferably a universal motor. For selecting the speed, a speed selector 18 is provided which may, for example, be coupled with the on-off switch 15 so that increased pressure on the push button constituting switch 15 causes a continuous increase in the selected speed.

The speed regulating apparatus 17 is enclosed in dash dot lines in FIG. 2. It includes a microcomputer 19, a thyristor circuit 20 which is electrically connected to the electric circuit of motor 13, and a speed measuring unit 21 which measures the actual speed of motor 13. The speed measuring unit 21 is preferably a tachometer. The tachometer output is connected to microcomputer 19 and furnishes an input signal to the microcomputer which constitutes data regarding the actual speed. In the same way, the speed selector 18 is connected to microcomputer 19 so that the microcomputer also receives a desired speed signal. The microcomputer 19 now compares the desired motor speed to the actual motor speed and, for a difference between the two, furnishes a corresponding control signal to thyristor circuit 20. This control signal changes the ignition time of the thyristor circuit 20 and therefore changes the angle throughout which the thyristor circuit will conduct in each cycle. The change in conduction angle is such as to drive the difference between the actual speed and the desired speed to zero.

The speed of rotation of spindle 11 may also be changed by changing the gear ratio between the electric motor and the spindle. For this purpose, a gear selector switch 22 is provided (FIGS. 1 and 2). The change in gear ratio can be carried out mechanically or electrically. Once selected, the gear ratio remains the same, independent of changes in speed called for by the operator via the speed selector 18. A signal signifying the then-present gear is furnished by a unit 23 which is connected to microcomputer 19. The microcomputer thus also receives a signal indicative of the then-present gear ratio.

Overload measuring or sensor apparatus 24 is also connected to electromotor 13 and to microcomputer 19. Specifically, when the current through the motor exceeds the nominal value, an overload signal signifying motor overload is applied to microcomputer 19. A switch 25 is connected to the motor circuit and operates under control of microcomputer 19. If an overload signal is applied to microcomputer 19, the overload switch 25 is opened so that the current supply to electromotor 13 is interrupted. If the operator wishes to reestablish the current supply to the motor, a rest key 26 (FIG. 2) must be activated. Activation of key 26 causes a signal to be applied to microcomputer 19 which indicates that switch 25 is to be closed. Thus, in response to operation of key 26, microcomputer 19 will furnish a signal to switch 25 closing the latter.

A switch 27 (FIGS. 1 and 2) is provided for changing the direction of rotation of spindle 11. The actual direction of rotation of the spindle may be mechanically or electrically controlled. Depending upon the position of switch 27, spindle 11 will either rotate clockwise or counterclockwise. The position of switch 27 controls a unit 28 which furnishes a signal indicative of the direction of rotation of the bit to microcomputer 19.

A display 29 having optical display units 30 (FIG. 3) also operates under control of microcomputer 19. The displayed data include information regarding the then-present operating conditions of the tool such as whether it is ON or OFF, the direction of rotation of the bit, overload if present, etc. As mentioned above, information regarding these items is furnished in the form of input signals to the microcomputer by the corresponding units such as the speed selector unit 18, tachometer 21, unit 23 which furnishes a signal indicative of the then-present gear ratio, etc. Microcomputer 19 then controls display 29 in accordance with the so-applied input signals.

A first embodiment of display 29 is shown in FIG. 3. The actual or desired speed is indicated by a seven-segment indicator 31. The construction and operation of such a seven-segment indicator is well known and need not be described in detail here. Further, a display field 32 having a number of individual symbols 33 is provided. These symbols are illuminated or not illuminated in accordance with the then-present operating conditions. The illuminating elements are preferably light-emitting diodes which operate selectively under control of microcomputer 19. For example if the individual symbol E is energized, or illuminated, the drill is switched ON. Illumination of the signal in field 30' indicates overload, while the illumination of a selected one of the arrows on the display field 32 indicates the then-present direction of rotation of spindle 11.

The embodiment of display 34 shown in FIGS. 4 and 5 also includes a plurality of individual indicator fields 35. Indicator lamps 36, preferably light emitting diodes, are arranged either alongside or below the fields 35. Each lamp is associated to one of the fields. Two legend fields 37 and 38 are arranged along indicator fields 35 in display 34. Each of the legend fields indicates the particular operating condition associated with its indicator field. Legend field 37 gives different values of the rotational speed of the bit in revolutions per minute, while legend field 38 gives information as to the then-present operating conditions of the tool. For example, "on" signifies that the tool is energized, "first or low gear" and "second or high gear" signify the then-present gear ratio, "left" and "right" signify the direction of rotation of spindle 11, "overload" constitutes a warning that the motor is being overloaded, while "overload-auto" signifies that the automatic overload circuit has responded, that is, switch 25 (FIG. 2) has opened.

Each of lamps 36 is arranged underneath one of fields 35. Each is selectively energized by microcomputer 19. The illuminated fields next to particular positions on the legend field indicate the then-present operating condition, so that the user can take in all such operating conditions at one glance. If, for example, the tool is energized, the gearing is in first gear and the spindle is turning in the clockwise direction at a speed of 1500 rpm, then the fields indicated by crosshatch lines in FIG. 4 will be illuminated.

So that display 29 or 34 will be fully in view of the user even during operation of the tool, the display is arranged on the upper portion 39 of housing 10 opposite handle 14. Preferably the display is flush with the wall of the housing (FIGS. 1 and 5).

Alternatively, instead of the closed loop system described above, an open loop system can be used for speed regulation. In this case, the tachometer can be dispensed with so that the speed regulation circuit is simplified. The angle of conduction of thyristor circuit 20 is then controlled by microcomputer 19 in accordance with its program.

Various changes and modifications may be made within the scope of the inventive concepts.

We claim:
1. Hand-held tool having
a reversible electric motor (13) driving a spindle (11);
a housing (10) for said motor;
a handle (14, 16) on said housing extending from a predetermined surface thereof;
a microcomputer (19) controlling the speed of said motor located in the housing;
operator controlled speed selector means (15) providing a selected speed signal corresponding to a desired motor speed to the microcomputer;
direction selection means (27) coupled to said motor and to said microcomputer;
overload sensing means (24) connected to the motor and providing an overload signal to the microcomputer;
overload switch means (25) connected to and controlled by said microcomputer and further connected to said electric motor for interrupting current to the motor in response to an overload trip signal supplied by said microcomputer when the sensed overload signal exceeds a predetermined limit;
visual display means having a plurality of display fields respectively representative of selected operating parameters or conditions of said tool,
said visual display means being connected to and controlled by the microprocessor and
located adjacent each other on a surface of the tool which, in operation thereof, faces upwardly for furnishing an optical display of then present operating conditions of said tool comprising at least three of the four parameters of:
condition of energization of the motor;
direction of rotation of the motor;
speed of the spindle;
presence or absence of overload.
2. Tool according to claim 1, further including a tachometer coupled to the motor and providing an output signal representative of actual motor speed, the microcomputer controlling the actual motor speed with reference to the selected speed;
and wherein the display means displays all four parameters of motor operation.
3. Tool according to claim 1, wherein the display fields comprise legend fields (37, 38) having discrete legend areas, and a plurality of indicating lamps (35) arranged in proximity of said discrete legend areas, each for illuminating one of said discrete legend areas to identify the operating parameter associated with each of said legend areas arranged alongside the respective indicating lamps.
4. Tool according to claim 1, wherein said display fields comprise display areas displaying a symbol, and means for individually illuminating each of said symbols.
5. Hand-held tool having
a reversible electric motor (13) driving a spindle (11);
a housing (10) for said motor;
a handle (14, 16) on said housing extending from a predetermined surface thereof;
a microcomputer (19) controlling the speed of said motor located in the housing;
operator controlled speed selector means (15) providing a selected speed signal corresponding to a desired motor speed to the microcomputer;
direction selection means (27) coupled to said motor and to said microcomputer;
a gearing coupling the spindle to said motor and gear selecting means (22) connected to said gearing for control of the gear ratio of said gearing;
means (23) connected to said gear selector means for furnishing a selected gear input signal to said microcomputer, corresponding to the selected gear;

overload sensing means (24) connected to the motor and providing an overload signal to the microcomputer;

overload switch means (25) connected to and controlled by said microcomputer and further connected to said electric motor for interrupting current to the motor in response to an overload trip signal supplied by said microcomputer when the sensed overload signal exceeds a predetermined limit;

visual display means having a plurality of display fields respectively representative of selected operating parameters or conditions of said tool, said visual display means being connected to and controlled by the microprocessor and located adjacent each other on a surface of the tool which, in operation thereof, faces upwardly for furnishing an optical display of then present operating conditions of said tool comprising at least four of the five parameters of:

condition of energization of the motor;
direction of rotation of the motor;
speed of the spindle;
presence or absence of overload;
selected gear ratio.

6. Tool according to claim 5, further including a tachometer coupled to the motor and providing an output signal representative of actual motor speed, the microcomputer controlling the actual motor speed with reference to the selected speed;

and wherein the display means displays all five parameters of motor operation.

7. Tool according to claim 5, wherein the display fields comprise legend fields (37, 38) having discrete legend areas, and a plurality of indicating lamps (35) arranged in proximity of said discrete legend areas, each for illuminating one of said discrete legend areas to identify the operating parameter associated with each of said legend areas arranged alongside the respective indicating lamps.

8. Tool according to claim 5, wherein said display fields comprise display areas displaying a symbol, and means for individually illuminating each of said symbols.

9. Tool according to claim 5, wherein the display fields comprise a first row of indicator fields, each listing a discrete controllable motor speed;

a second row of indicator fields, each listing an engine operating parameter other than speed;

and a plurality of indicating lamps arranged in proximity to said indicator fields in the respective rows, and providing an identification of the then pertaining spindle speed and operating parameters of the tool.

10. Tool according to claim 1, wherein the display fields comprise a first row of indicator fields, each listing a discrete controllable motor speed;

a second row of indicator fields, each listing an engine operating parameter other than speed;

and a plurality of indicating lamps arranged in proximity to said indicator fields in the respective rows, and providing an identification of the then pertaining spindle speed and operating parameters of the tool.

11. Tool according to claim 5, wherein the tool is an electric drill.

12. Tool according to claim 9, wherein the tool is an electric drill.

13. Tool according to claim 1, wherein the tool is an electric drill.

* * * * *